US010891791B2

United States Patent
Sadovitch

(10) Patent No.: US 10,891,791 B2
(45) Date of Patent: Jan. 12, 2021

(54) DETECTION AND VISUALIZATION OF SYSTEM UNCERTAINTY IN THE REPRESENTATION OF AUGMENTED IMAGE CONTENT IN HEADS-UP DISPLAYS

(71) Applicant: VOLKSWAGEN AKTIENGESELLSCHAFT, Wolfsburg (DE)

(72) Inventor: Vitalij Sadovitch, Braunschweig (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 8 days.

(21) Appl. No.: 16/175,040

(22) Filed: Oct. 30, 2018

(65) Prior Publication Data

US 2019/0147656 A1 May 16, 2019

(30) Foreign Application Priority Data

Nov. 14, 2017 (DE) .......................... 10 2017 220 268

(51) Int. Cl.
*G06T 19/00* (2011.01)
*B60W 50/14* (2020.01)
(Continued)

(52) U.S. Cl.
CPC ............ *G06T 19/006* (2013.01); *B60K 35/00* (2013.01); *B60R 1/00* (2013.01); *B60W 50/14* (2013.01);
(Continued)

(58) Field of Classification Search
None
See application file for complete search history.

(56) References Cited

U.S. PATENT DOCUMENTS

2007/0146391 A1* 6/2007 Pentenrieder ......... G06T 19/006 345/633
2008/0100614 A1* 5/2008 Augst ................... G06T 19/006 345/419
(Continued)

FOREIGN PATENT DOCUMENTS

DE 10344120 A1 4/2005
DE 102006010478 A1 9/2007
(Continued)

OTHER PUBLICATIONS

Haeuslschmid, Renate, et al. "Contact-analog warnings on windshield displays promote monitoring the road scene." Proceedings of the 7th international conference on automotive user interfaces and interactive vehicular applications. 2015.*

(Continued)

*Primary Examiner* — Ryan M Gray
(74) *Attorney, Agent, or Firm* — Barnes & Thornburg LLP

(57) ABSTRACT

A method for the recognition and visual display of system uncertainty in the representation of augmented image contents in heads-up displays which provides that AR image contents are adapted through a change of representation so that the inaccuracies of representation that are present are not perceived as errors by the observer. A characteristic value is determined that quantifies the system uncertainty in the representation of the AR image contents. An adaptation of the representation takes place on the heads-up display depending on this characteristic value. Also disclosed is a device by which the method is carried out.

14 Claims, 2 Drawing Sheets

(51) Int. Cl.
*G03B 21/10* (2006.01)
*G02B 27/01* (2006.01)
*B60K 35/00* (2006.01)
*B60R 1/00* (2006.01)
*G01S 19/24* (2010.01)
*G06T 7/00* (2017.01)
*G01C 21/36* (2006.01)

(52) U.S. Cl.
CPC .............. *G01S 19/24* (2013.01); *G02B 27/01* (2013.01); *G02B 27/0101* (2013.01); *G03B 21/10* (2013.01); *G06T 7/0002* (2013.01); *B60K 2370/1529* (2019.05); *B60K 2370/177* (2019.05); *B60K 2370/334* (2019.05); *B60K 2370/52* (2019.05); *B60K 2370/736* (2019.05); *B60R 2300/205* (2013.01); *B60R 2300/207* (2013.01); *B60R 2300/302* (2013.01); *B60W 2555/00* (2020.02); *G01C 21/365* (2013.01); *G02B 2027/014* (2013.01); *G02B 2027/0138* (2013.01); *G02B 2027/0141* (2013.01); *G06T 2207/30252* (2013.01)

(56) References Cited

U.S. PATENT DOCUMENTS

| | | | |
|---|---|---|---|
| 2009/0005961 | A1 | 1/2009 | Grabowski et al. |
| 2009/0189753 | A1* | 7/2009 | Enya .................. G02B 27/01 340/435 |
| 2014/0222277 | A1* | 8/2014 | Tsimhoni ............. B60W 30/08 701/23 |
| 2014/0379260 | A1* | 12/2014 | Maihoefer ........... G01C 21/365 701/538 |
| 2015/0062168 | A1* | 3/2015 | Ng-Thow-Hing ..... G02B 27/01 345/633 |
| 2016/0054563 | A9* | 2/2016 | Fujimura ............... G02B 27/01 359/630 |
| 2016/0210786 | A1* | 7/2016 | Meier .................. G02B 27/017 |

FOREIGN PATENT DOCUMENTS

| | | |
|---|---|---|
| DE | 112006002459 T5 | 8/2008 |
| DE | 102009004432 A1 | 7/2009 |
| DE | 102008042825 A1 | 4/2010 |
| DE | 102009045169 A1 | 3/2011 |
| DE | 102010013224 A1 | 3/2011 |
| DE | 102012001951 A1 | 8/2013 |
| DE | 102015001360 A1 | 8/2015 |
| WO | 2006072527 A1 | 7/2006 |

OTHER PUBLICATIONS

Search Report for German Patent Application No. 10 2017 220 268.8; dated Jul. 20, 2018.

* cited by examiner

DETECTION AND VISUALIZATION OF SYSTEM UNCERTAINTY IN THE REPRESENTATION OF AUGMENTED IMAGE CONTENT IN HEADS-UP DISPLAYS

PRIORITY CLAIM

This patent application claims priority to German Patent Application No. 10 2017 220 268.8, filed 14 Nov. 2017, the disclosure of which is incorporated herein by reference in its entirety.

SUMMARY

Illustrative embodiments relate to a method for the recognition and visual display of system uncertainty in the representation of augmented image contents in heads-up displays, in particular, in transportation vehicles, as well as a device for carrying out the method.

BRIEF DESCRIPTION OF THE DRAWINGS

The disclosed embodiments will now be described with reference to the drawings, in which.

DETAILED DESCRIPTION

Figure 1:
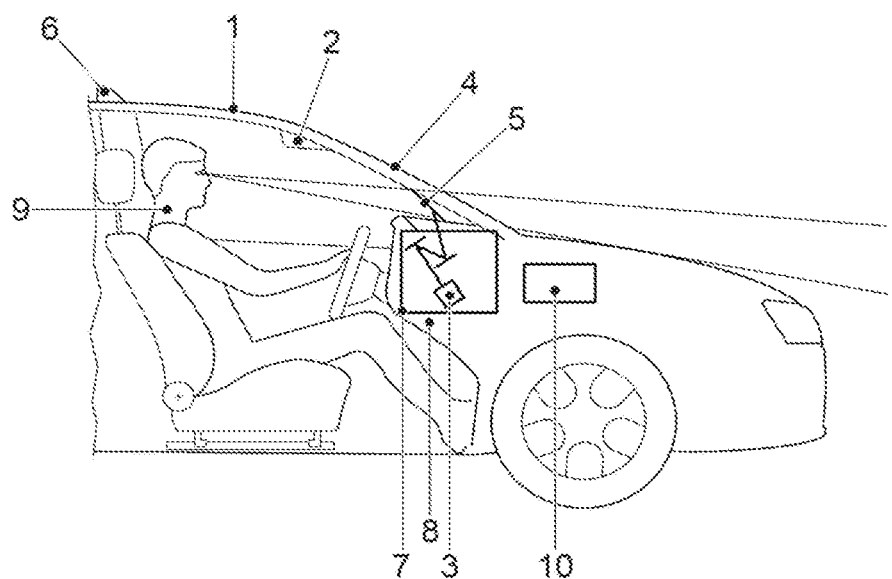
FIG. 1 contains the device for carrying out the disclosed method installed in a transportation vehicle, FIG. 2 contains display examples for AR image contents on a heads-up display, and FIG. 3 contains the disclosed method for the representation of augmented image contents in a heads-up display.

Heads-up displays (HUDs) are gaining increasing significance, particularly in transportation vehicles. In contrast to other display devices, they offer the possibility of superimposing information for the driver directly in his field of view. He therefore no longer has to turn his view away from traffic events which, in spite of the generally short moment of looking away, is always associated with a certain safety risk.

Heads-up displays are nowadays already offered as special equipment by manufacturers. The speed, navigation instructions and relevant traffic signs are displayed here as information.

The application of heads-up displays is not limited to transportation vehicles; in other modes of transport, in particular, aircraft, they also represent a powerful technical apparatus for supporting the transportation vehicle driver (or the pilot in an aircraft).

From the point of view of structure, heads-up displays can be divided into the imaging unit and the projection surface. The image elements to be shown on the heads-up display are generated in the imaging unit, and are emitted by a projection apparatus in the direction of the projection surface. The light beams here generally travel along a bent beam path created by appropriate mirrors. This is necessary to limit the installation space required for the imaging unit. The image itself arises on a special projection surface. This can be a so-called combiner screen located in the field of view of the driver. Alternatively, the image is generated directly on the windshield, whereby the combiner screen can be omitted.

The term "heads-up display" is often used for the projection surface itself. Strictly speaking, the apparatus however additionally includes the imaging unit, the apparatus for creating the necessary beam path, as well as the necessary control devices for generating the image contents. The term "heads-up display" is used for the apparatus as a whole, and reference is made to a representation on the heads-up display, even though the actual representation takes place exclusively on the projection surface.

To increase the information content and to establish a direct reference to the environment, augmented-reality technologies (AR technologies) are increasingly being incorporated into the representations on the heads-up displays. Virtual image elements that extend or augment the real, visible image are displayed with this technology. Augmented image contents of this sort can, for example, be navigation instructions that not only display the driving direction itself, but also indicate the road into which a turn should be made, and change dynamically with the transportation vehicle movement.

To create the sense of a natural image, an attempt is made to display the information of augmented image contents according to its position and orientation in the real world. This is referred to as a contact-analog display.

In addition to the known driver information, additional image elements that go beyond the classic display contents in a transportation vehicle can be displayed with the AR technology. Indications regarding particular driving or hazard situations are an example of this. This can, for example, be an indication of a person who is located on or about to enter the roadway, or of a transportation vehicle that is to be considered in relation to a forthcoming driving maneuver.

Very high requirements for precision are, in principle, placed on the representation of augmented image contents in a real image of the surroundings. This relates both to the positioning of the image contents as well as to the perspective alignment. Even very small deviations between the real image and the augmented image contents are perceived as an error. Very large deviations of, for example, a navigation instruction, can also result in mistaken driving maneuvers.

The reduction of imaging error in the representation of AR image contents, as well as the avoidance or reduction of a sense of error for the user, thus represent important technical tasks in the development of AR heads-up displays.

A method is therefore described in document DE 10344120 A1 that determines a reliability value for the accuracy of navigation instructions and adapts the representation of the instruction in accordance with the determined value. An illustration of navigation instructions in an image of the driving surroundings that can always be reliably interpreted should thereby be created.

A method is described in document DE 11 2006 002 459 B4, with the aid of which a visual emphasis is given to the object depending on the reliability with which an object in the environment is recognized. It is thus made possible to advise the driver of reliably recognized objects. Other objects are also represented, but not, however, emphasized visually.

In contrast, a method is presented in document DE 10 2015 001 360 A1 with the aid of which the accuracy of the determination of the transportation vehicle position is increased through a repeated determination of position. This increased accuracy in the positional determination can be used in the representation of AR information.

The representation errors cannot be entirely avoided, in spite of all the approaches to solutions for increasing the representational accuracy. The goal therefore further arises of reducing the perceptibility of an inaccuracy of representation.

According to the disclosed embodiments, this is achieved through a method and a device.

The technical effect of the present disclosure consists in enabling a display of contact-analog AR image contents in a heads-up display in such a way that the user does not perceive the representation as erroneous, or does not do so as acutely.

The disclosed method provides that an image of the real world is first captured with the aid of a camera. This image is made available to a control device in which it is evaluated. The task of the control device here is to determine the AR image contents, both in terms of the contents and in terms of the positioning in the real image.

Contact-analog navigation instructions or other warning or hazard information may be considered as AR image contents. A transportation vehicle that is located in the field of view of the driver and which is potentially the source of a hazard can, for example, be emphasized through a suitable superimposition. It is thus easier for the user to recognize such a hazardous situation.

The AR image contents, along with the general driver information such as the speed, for example, are projected onto the heads-up display. The representation is here either made directly on the windshield or on the combiner screen, depending on the structure of the HUD. The driver thus perceives both the real image of the surroundings as well as the image contents projected on the heads-up display.

In a further operation of the disclosed method, a characteristic value that describes the system uncertainty in the representation of the augmented image contents is determined. A numerical value that evaluates the various sensor information items and/or the information from various computer devices and combines them into a value that describes the system uncertainty in the representation of the AR contents is understood here as such a characteristic value.

The augmented image contents are adapted both in terms of the representation form as well as of the positioning in the heads-up display on the basis of the determined characteristic value. Fundamentally, all geometrical shapes with which additional information can be superimposed onto the real image of the surroundings in the heads-up display are understood as the representation form. These can be circles, rectangles, arrows etc. In addition to the geometrical shape, any additional adaptation of the symbol is furthermore subsumed under the term "representation form". The generation of fuzzy edges, the rounding of corners or the pixellation of the symbol or parts thereof fall under this.

Dynamic effects with which the system uncertainty can be displayed visually to the driver are understood in respect of positioning in the sense of the disclosure. The shaking or vibration of the symbols are examples of this.

The disclosed method provides different method operations for the determination of the characteristic value with the aid of which the system uncertainty of the AR representation is described. It is obvious that any form of determination of the characteristic value can take place individually or in any desired combination of one or a plurality of method operations.

In a first exemplary embodiment of the disclosed method, the GPS signal quality is accessed for the determination of the characteristic value. Through an evaluation of the number of satellites that are available at the current location, as well as of the strengths of the individual GPS signals, a measured value for the signal quality at the current location can be determined. This can be used as a basis for the selection and design of the best possible representation of the AR contents.

In a further exemplary embodiment of the disclosed method, the map material present for the current location is graded, and employed as a basis for the determination of a characteristic value for describing the system uncertainty. This operation is based on the recognition of the fact that the cartography of map material depends on the location. Specific additional information (road width/incline, height profile etc.) is not available for every road or every location. The system inaccuracy resulting from this when representing the AR image contents is, however, dependent on the level of detail of the available additional information.

In a further disclosed embodiment, the transportation vehicle movements are accessed as a measure for the system inaccuracy. This method operation is based on the recognition of the fact that pitching movements of the transportation vehicle, for example, are a significant factor contributing to the representation inaccuracy of the AR contents. They result on the one hand from the driving dynamics (acceleration and braking), and on the other hand from irregularities of the roadway. Since, as a rule, the roadway profile only changes slightly within a few meters, future movements of the transportation vehicle can be deduced from the capture of the current transportation vehicle movements with the aid of acceleration and rotation rate sensors. The measurement of the transportation vehicle body movements can be made by a gyroscope. The greater the changes in the angle and its rate of change are, the stronger the negative influence on the accuracy of the display is.

In a further exemplary embodiment of the disclosed method, the contents of the camera image are accessed. The camera and evaluation systems available nowadays are usually capable of recognizing and identifying lane markings and selected fixed reference points such as traffic signs etc. If no such fixed image elements are recognizable in the camera image, then a higher inaccuracy is to be expected in the representation of AR contents.

In an exemplary embodiment of the disclosed method, access is made to an additional camera. If this camera is so arranged that the recorded image corresponds to the image that the driver sees on the heads-up display, a characteristic value for the system uncertainty can be derived from the resulting shifts between the real image and the augmented image contents. Just like the respective characteristic values of the previously described embodiments, this characteristic value can be used to modify the augmented image contents in such a way that the imaging error is not perceived as disruptive.

It is a prerequisite for the described development of the method that the additional camera is attached in the eyebox of the driver, for example, to a glasses frame of the driver. It is then possible to calculate, using image processing algorithms, how large the deviation between the image of the surroundings and the augmented image contents is.

The eyebox is understood to refer to a cuboid body in which the eyes of the observer must be located. The contents of the heads-up display are not visible outside the eyebox, and the projection surface is transparent for the observer.

The disclosed method provides two different developments for adapting the augmented image contents depending on the determined system uncertainty. In a first development, the symbols with which the augmented image contents are represented are modified graphically according to the determined system uncertainty, which means that the type of the representation is adapted. If a section of the superimposed real image is masked for emphasis with the aid, for example, of a rectangle, then by showing the outline in soft focus, a change in the brightness, or a pixellation of the surface, i.e., converting the flat representation to a pixellated representation, a fuzziness can be generated that is less erroneous in the perception of the driver. An increased transparency of the symbol can, for example, be a further adaptation of the augmented image contents.

In another development of the method, the augmented image contents are set into a high-frequency motion of their own, a shaking or vibration. Such a form of representation is classified by the observer as less erroneous. This results primarily from the fact that a direct comparison between the image contents and the real surroundings along sharp edges cannot take place. The edges of the augmented image contents blur visually as a result of the contents' motion of their own. While any system inaccuracies are not avoided in this way, they are, however, not perceived as erroneous by the observer.

The disclosed device is designed in such a way that it is suitable for carrying out the method described previously.

It possesses at least one camera for the capture of an image of the real world. A control device is provided to evaluate this image. The necessary algorithms with which the AR image contents can be determined are stored in it.

The AR image contents, as well as the other information to be displayed in the heads-up display, are transmitted to the projection surface by a projection apparatus and by mirrors with which a bent beam path can be generated.

A characteristic value that describes the system uncertainty of the augmented image contents can be determined with the aid of a computer device on the basis of sensor data. To avoid giving the user the impression of a display fault, a control device is provided, with the aid of which the augmented image contents can be adapted in terms of their graphic representation and/or in terms of their positioning. When positioning, the disclosed device provides that the augmented image contents can be set into a high-frequency natural oscillation, a vibration or a shaking.

The individual elements of the disclosed device are represented in FIG. 1. A transportation vehicle 1 that is fitted with a heads-up display 5, 7 can first be recognized. In the exemplary embodiment, this heads-up display 5, 7 consists of the imaging unit 7 which is installed in the instrument panel, as well as the so-called combiner screen 5, on which the actual image becomes visible for the driver. The combination of combiner screen 5 and imaging unit 7 is referred to below as the heads-up display 5, 7, even though the actual image representation becomes visible exclusively on the combiner screen 5.

Typically, driver information such as, in particular, the speed, or advice regarding traffic signs, is represented with heads-up displays 5, 7. Additional information can moreover be output to the driver such as, for example, information about driving directions or hazard warnings.

Individual image contents are emphasized to visually display hazard warnings 11, 12, 13. This, for example, involves transportation vehicles, persons and other objects of which the driver should be made aware.

An image of the surroundings is recorded by a camera 2, which is typically attached in the region of the rear view mirror, for positioning the hazard warnings in the real image perceived by the driver. This image of the surroundings is made available by a control device 10.

The additional augmented image contents are calculated in the control device 10.

To point out to the driver the living beings and objects that have been explained by way of example, the solution described in the exemplary embodiment provides a masking of the corresponding living beings or objects. Transparent image elements 11, 12, 13 are generated for this purpose by the control device 10, and are positioned in the heads-up display 5, 7 in such a way that they cover the corresponding image contents of the real image. The driver thereby continues to recognize the real image elements lying in the background, from which a hazard possibly originates. His attention is, however, drawn immediately to this element through the superimposition of a transparent, augmented image element 11, 12, 13.

In addition to the preparation and positioning of the individual augmented image elements 11, 12, 13, the control device 10 also performs the evaluation of additional information. It is designed for this purpose in such a way that a characteristic value for quantifying the system uncertainty can be derived with its aid on the basis of stored algorithms.

This characteristic value is processed further in the control device 10. It is configured in such a way that, as far as both the positioning and the graphical representation are concerned, it can perform an adaptation of the AR image contents 11, 12, 13. To represent the image elements 11, 12, 13 calculated here, the projection apparatus 3 is set up so that the image can be represented in the HUD display 5, 7 via a bent beam path.

To determine the characteristic value with which the system uncertainty is described, the disclosed device provides different calculation algorithms in different embodiments. In the exemplary embodiment these algorithms are all implemented in the control device 10. It is obvious that both each individual disclosed embodiment as well as an arbitrary combination of the different disclosed embodiments can be stored in the control device 10. The following disclosed embodiments of the determination of the characteristic value are addressed in the algorithm in the exemplary embodiment:

Determination of the characteristic value through an evaluation of the GPS signal quality;

Determination of the characteristic value through an evaluation of the map material available at the current location;

Determination of the characteristic value through an evaluation of the transportation vehicle body movements;

Determination of the characteristic value through a comparison of the locally-related information stored in the map material with the information from the camera image;

Determination of the characteristic value through a direct evaluation of the image on the HUD display 5, 7.

Figure 2:
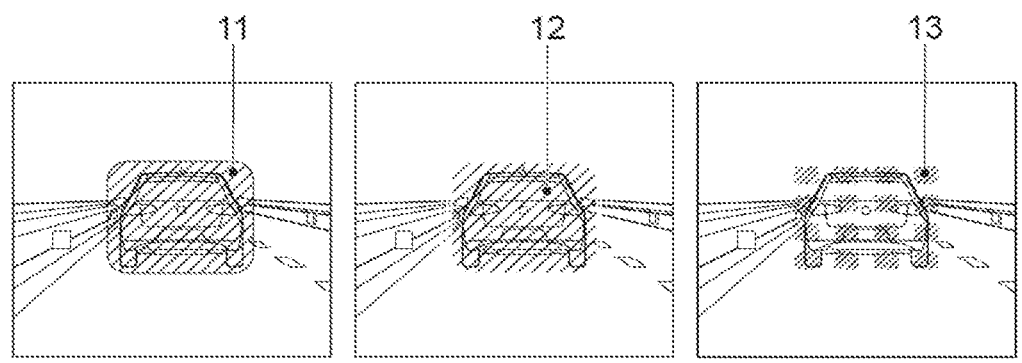

Various adaptations of an image element based on the determined characteristic value are represented in FIG. 2. A projection of a rectangle 11 to emphasize a preceding transportation vehicle can be recognized as the initial element. This rectangle is transparent, so that the driver can clearly recognize the preceding transportation vehicle. In a first disclosed embodiment, the edges of the transparent rectangle 11 are shown fuzzy. Just like the transparent rectangle 12, this form of representation makes the system uncertainty described by the determined characteristic value present in the system clear to the driver.

In a further disclosed embodiment, the transparent rectangle is replaced by a grid 13 of dots. Such an image element allows an existing positioning error to appear less distinctly.

In a further exemplary embodiment of the disclosed method, the augmented image element 11, 12, 13 is set into a high-frequency motion of its own, i.e., a shaking or vibration, to emphasize the hazardous object. It is obvious that this adaptation can be performed both for the full-surface image elements 11, 12 described as well as for the grid-like image element 13.

Basically, the technical effect of permitting a representation that appears less erroneous to the observer, that is the driver 9 in the case of a transportation vehicle, is achieved through the adaptation of the AR image elements 11, 12, 13. Which adaptation 11, 12, 13 is selected here can be made by the device itself or through a manual specification on the part of the driver 9. An appropriate configuration menu would have to be stored for this purpose, with the aid of which the driver can specify the type of adaptation 11, 12, 13 manually.

Figure 3:
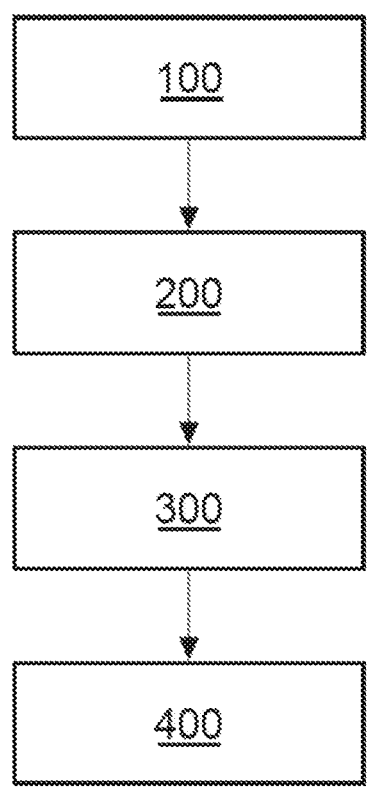

The individual operations of the disclosed method are represented in an exemplary embodiment in a transportation vehicle 1 in FIG. 3.

The actual HUD image is generated in a first operation at 100, and projected onto the projection surface 5 of the HUD display 5, 7. The image is composed of a plurality of image elements. These involve the additional information for the driver 9, e.g., the transportation vehicle speed, as well as the augmented image contents 11, 12, 13, which are generated by the control device 10 on the basis of the camera image which is captured by the camera 2.

The characteristic value for the description of the system uncertainty is determined in an operation at 200. This operation is executed with appropriate algorithms in the control device 10. Various evaluations are performed here in the exemplary embodiment, and condensed into a descriptive characteristic value. The following evaluations are provided in the exemplary embodiment:
- a determination of the GPS signal quality,
- a determination of the accuracy of the map material available at the current location,
- a determination of the current transportation vehicle body movements,
- a comparison of the locally-related information stored in the map material with the information from the camera image.

The individual evaluations are combined into an overall characteristic value that describes the system uncertainty.

The representation of the augmented image contents 11, 12, 13 is modified in operation at 300 depending on the characteristic value. In the exemplary embodiment, the AR image element 11, 12, 13 is set into a high-frequency motion of its own to emphasize the preceding transportation vehicle. The observer thus perceives the AR image element 11, 12, 13 as less erroneous, although the contours of the image element and the outlines of the preceding transportation vehicle differ from one another slightly as a result of the unavoidable inaccuracy in the representation.

The augmented image contents are output on the combiner screen 5 of the heads-up display 5, 7 in operation at 400.

LIST OF REFERENCE SIGNS

1 Transportation vehicle
2 Camera
3 Projection unit
4 Windshield (projection surface)
5 Combiner screen (projection surface)
6 GPS antenna
7 Image generation unit
8 Instrument panel
9 Driver
10 Control device
11 Augmented reality image element (hazard warning)
12 Augmented reality image element (hazard warning)
13 Augmented reality image element (hazard warning)
100 Projection of the image element onto the projection surface
200 Determination of the characteristic value
300 Adaptation of the AR image contents
400 Projection of the adapted AR image contents

The invention claimed is:

1. A device for the recognition and visual display of system uncertainty in the representation of augmented image contents in a heads-up display that displays augmented image contents as a contact-analog display, the device comprising:
at least one camera for the capture of image data for an image of the real world;
a control device for determining augmented image contents for representation as contact-analog data along with image data depicting the real world; and
a heads-up display on which the determined augmented image contents are represented, wherein the augmented image contents appear integrated into an image displayed on the heads-up display based on the image data depicting the real world from the point of view of the observer,
wherein the control device determines a characteristic value that describes the system uncertainty of the determination of the augmented image contents in relation to the image of the real world, and
wherein the control device modifies the augmented image contents displayed on the heads-up display depending on the determined characteristic value by deemphasizing the augmented image contents to be less erroneous in order to reduce the observer's perception of inaccuracy of the representation of the augmented image contents that results from movement of the transportation vehicle relative to an environment.

2. The device of claim 1, wherein a GPS signal quality is captured and is considered as part of determining the characteristic value that describes the system uncertainty.

3. The device of claim 1, wherein map material available at the current location of the transportation vehicle is considered as part of determining the characteristic value that describes the system uncertainty.

4. The device of claim 1, wherein movements of a transportation vehicle body of the transportation vehicle in which the heads-up display is installed are captured and considered as part of determining the characteristic value that describes the system uncertainty.

5. The device of claim 3, wherein the captured image data is compared with the fixed-location information stored in the map material and a result of the comparison is considered as part of determining the characteristic value that describes the system uncertainty.

6. The device of claim 1, wherein image data for an image of a representation on the heads-up display is acquired by a further camera that is arranged in an eyebox of the observer who is a driver of the transportation vehicle, and wherein the characteristic value describing the system uncertainty is further determined based on a comparison of image data depicting the augmented image contents acquired by the further camera with the image data of the real world.

7. The device of claim 1, wherein the augmented image contents are displayed on the heads-up display to depict movement of the augmented image contents relative to the displayed image data of the real world such that the movement is an indication of the system uncertainty according to the determined characteristic value.

8. A method for the recognition and visual display of system uncertainty in the representation of augmented image contents in a heads-up display that displays augmented image contents as a contact-analog display in a transportation vehicle, the method comprising:
- capturing image data of an image of the real world using at least one camera;
- transferring the captured image data to a control device;
- determining the augmented image contents;
- representing the augmented image contents in the heads-up display so that the augmented image contents are integrated into an image displayed on the heads-up display based on the image data depicting the real world from the point of view of the observer;
- determining a characteristic value that describes the system uncertainty of the determination of the augmented image contents in relation to the image of the real world; and
- adapting the augmented image contents displayed on the heads-up display depending on the determined characteristic value by deemphasizing the augmented image contents to be less erroneous in order to reduce the observer's perception of inaccuracy of the representation of the augmented image contents that results from movement of the transportation vehicle relative to an environment.

9. The method of claim 8, wherein a GPS signal quality is captured and is considered as part of determining the characteristic value that describes the system uncertainty.

10. The method of claim 8, wherein map material available at the current location of the transportation vehicle is considered as part of determining the characteristic value that describes the system uncertainty.

11. The method of claim 8, wherein movements of a transportation vehicle body of the transportation vehicle in which the heads-up display is installed are captured and considered as part of determining the characteristic value that describes the system uncertainty.

12. The method of claim 10, further comprising comparing the captured camera image with the fixed-location information stored in the map material, and wherein a result of the comparison is considered as part of determining the characteristic value that describes the system uncertainty.

13. The method of claim 8, further comprising acquiring image data of an image of the representation on the heads-up display by a further camera that is arranged in an eyebox of the observer, wherein the observer is a driver of the transportation vehicle, and wherein the characteristic value describing the system uncertainty is further determined based on a comparison of image data depicting the augmented image contents acquired by the further camera with the image data of the real world.

14. The method of claim 8, wherein the augmented image contents are displayed on the heads-up display to depict movement of the augmented image contents relative to the displayed image data of the real such that the movement is an indication of the system uncertainty according to the determined characteristic value.

* * * * *